(12) United States Patent
Kang et al.

(10) Patent No.: US 8,300,328 B2
(45) Date of Patent: Oct. 30, 2012

(54) LENS UNIT COMPOSED OF DIFFERENT MATERIALS AND CAMERA MODULE AND METHOD FOR MANUFACTURING THE SAME

(75) Inventors: Shinill Kang, Seoul (KR); Ji Seok Lim, Gyeonggi-do (KR); Min Seok Choi, Seoul (KR)

(73) Assignee: Optomecha Co., Ltd. (KR)

( * ) Notice: Subject to any disclaimer, the term of this patent is extended or adjusted under 35 U.S.C. 154(b) by 177 days.

(21) Appl. No.: 12/666,697

(22) PCT Filed: Jul. 3, 2008

(86) PCT No.: PCT/KR2008/003935
§ 371 (c)(1),
(2), (4) Date: Nov. 2, 2010

(87) PCT Pub. No.: WO2009/005317
PCT Pub. Date: Jan. 8, 2009

(65) Prior Publication Data
US 2011/0085070 A1  Apr. 14, 2011

(30) Foreign Application Priority Data
Jul. 3, 2007 (KR) .................. 10-2007-0066509

(51) Int. Cl.
*G02B 7/02* (2006.01)

(52) U.S. Cl. ................... 359/811; 359/819
(58) Field of Classification Search .......... 359/811, 359/819
See application file for complete search history.

(56) References Cited

U.S. PATENT DOCUMENTS 5,566,027 A   10/1996  Saitoh et al.
6,903,883 B2   6/2005  Amanai

FOREIGN PATENT DOCUMENTS

| JP | 1-263034 A | 10/1989 |
| JP | 2004-177863 A | 6/2004 |
| JP | 2006-251543 A | 9/2006 |
| JP | 2006-285109 A | 10/2006 |
| KR | 20020064179 | 8/2002 |

OTHER PUBLICATIONS

International Search Report, PCT/KR2008/003935, dated Dec. 19, 2008.

*Primary Examiner* — Ricky Mack
*Assistant Examiner* — Mahidere Sahle
(74) *Attorney, Agent, or Firm* — Lerner, David, Littenberg, Krumholz & Mentlik, LLP

(57) ABSTRACT

A lens unit composed of different materials includes a base and a lens. A part of a camera module of a different material from the lens is used as the base. The lens of optical resin is directly replicated on the base such that the lens is integrally formed on the base. A camera module is provided with the lens unit. The lens/lenses is/are formed on the single base/multiple bases to form the lens unit/units, using a die whose surface contacting the base slopes in relation to its central axis to allow the base to self-align.

12 Claims, 7 Drawing Sheets

[Fig. 1]
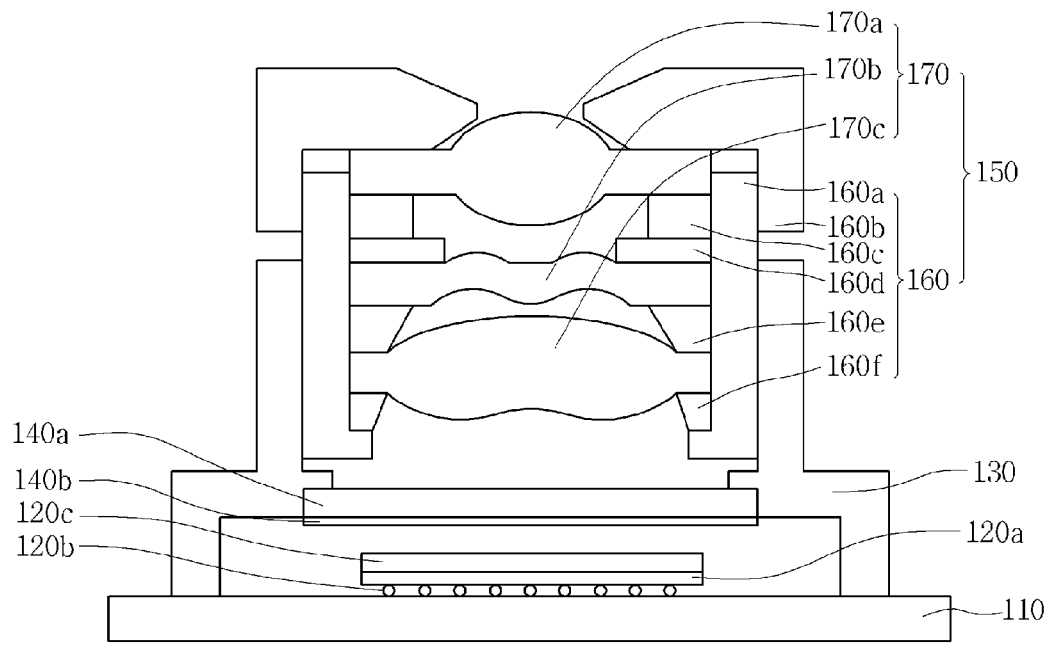
[Fig. 2]
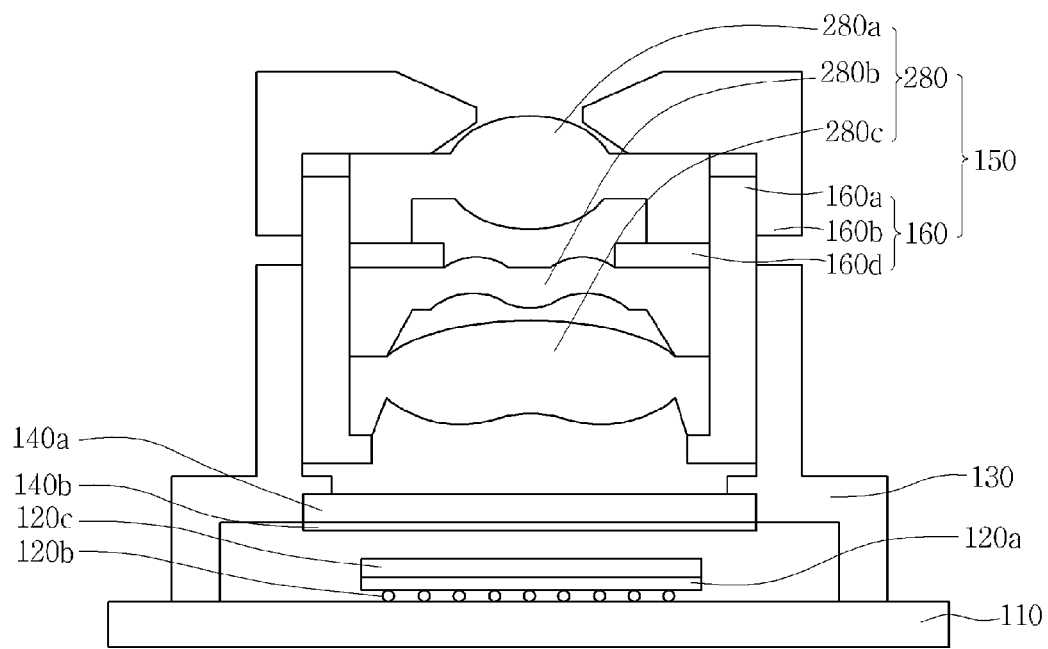

[Fig. 3]
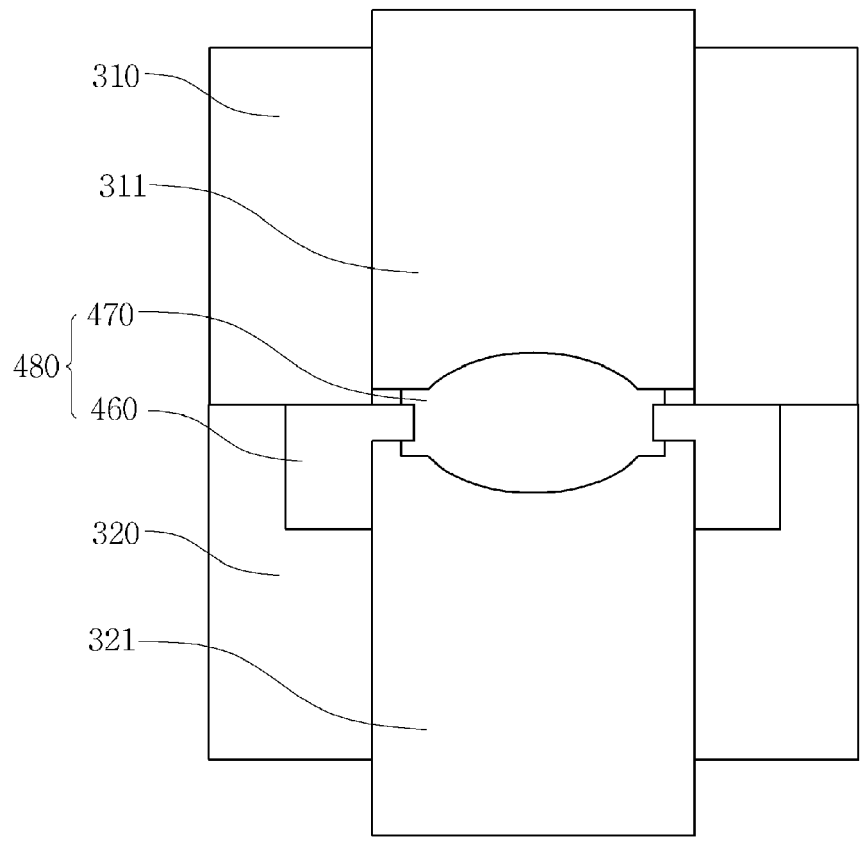
[Fig. 4]
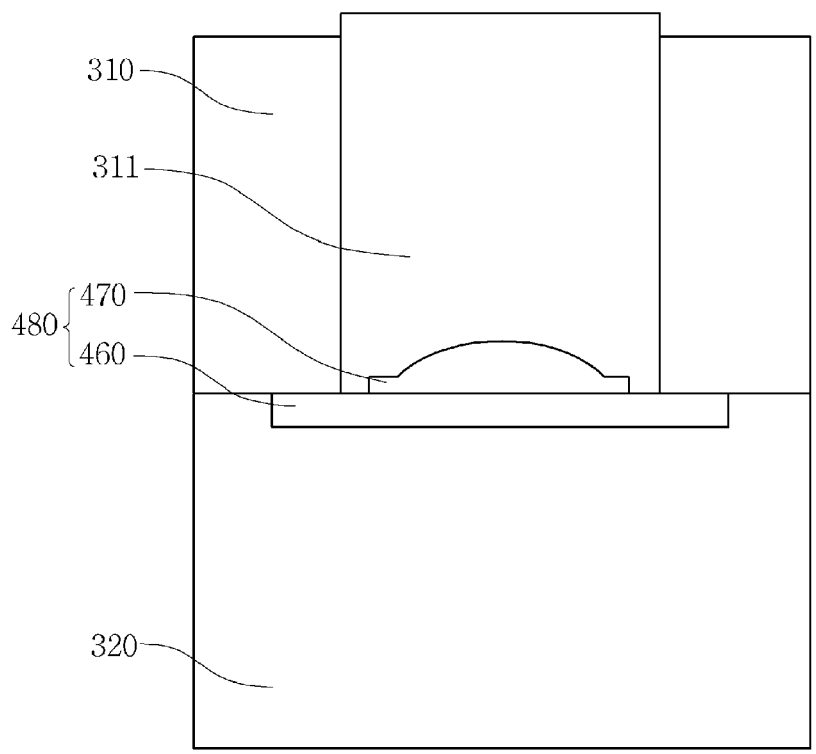

[Fig. 5]
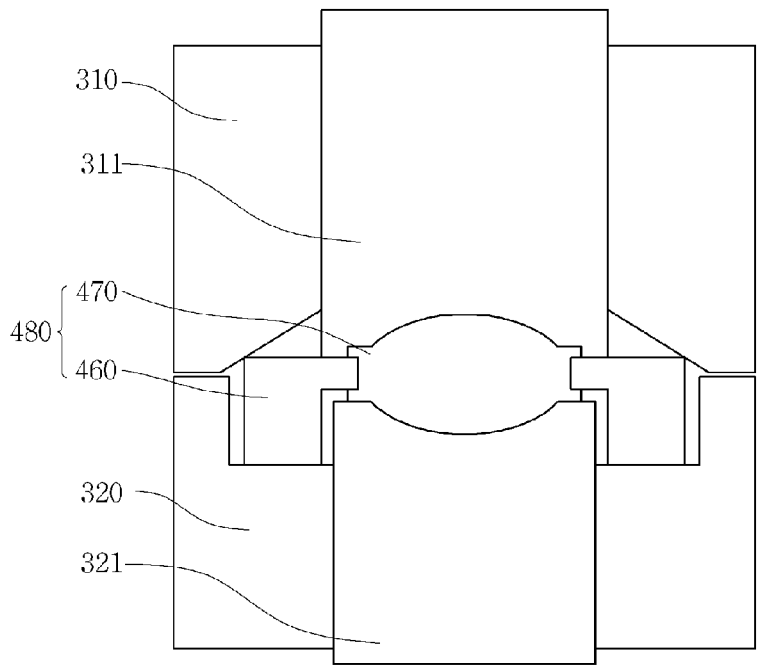
[Fig. 6]
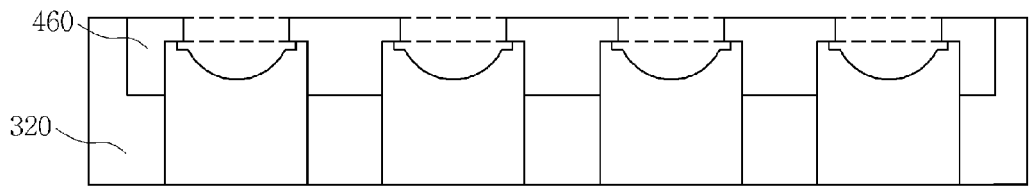
[Fig. 7]
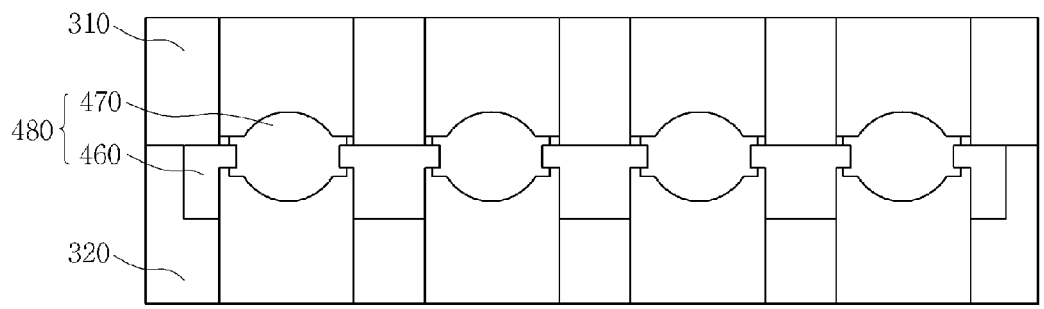
[Fig. 8]
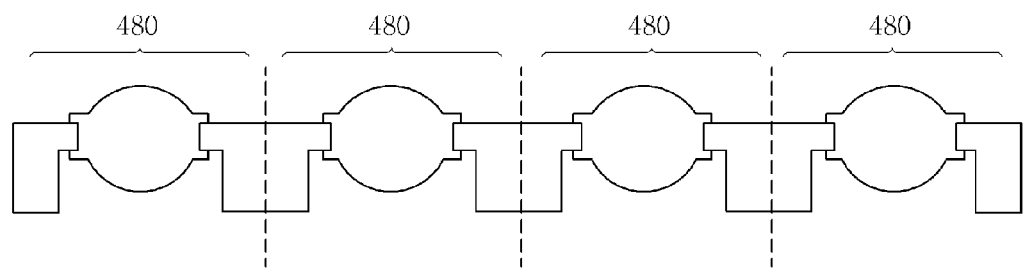

[Fig. 9]
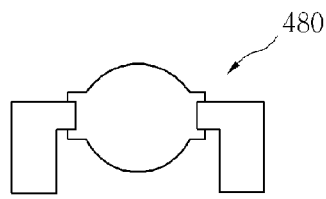
[Fig. 10]
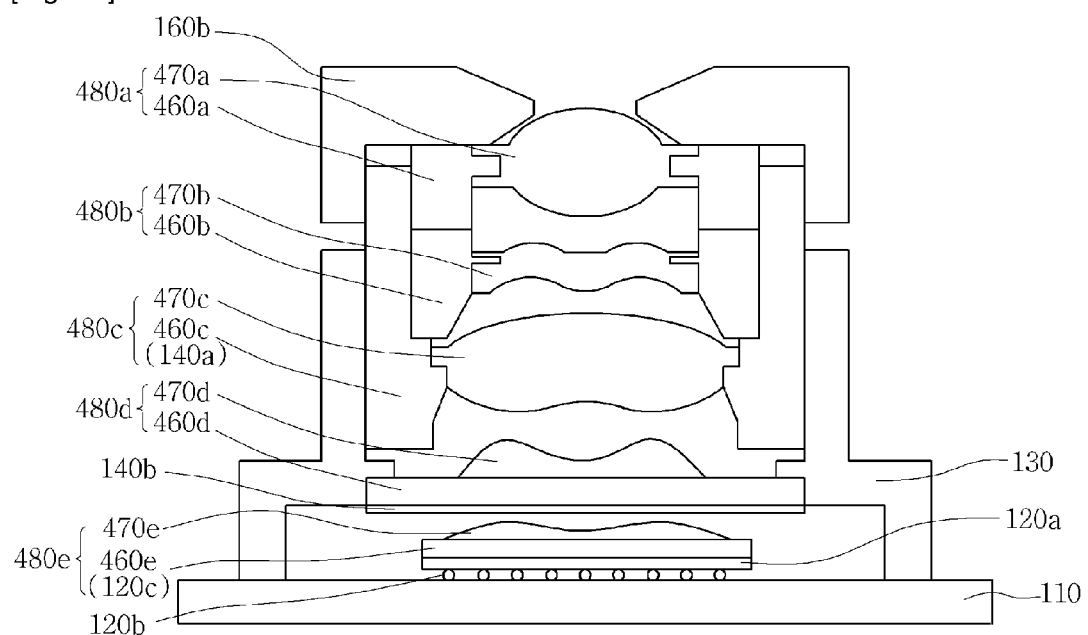
[Fig. 11]
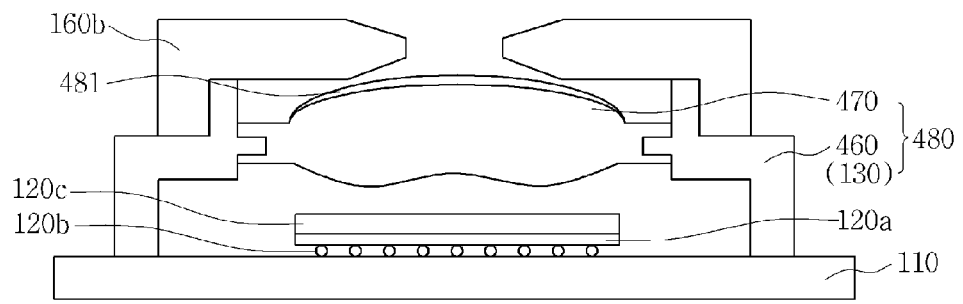

[Fig. 12]
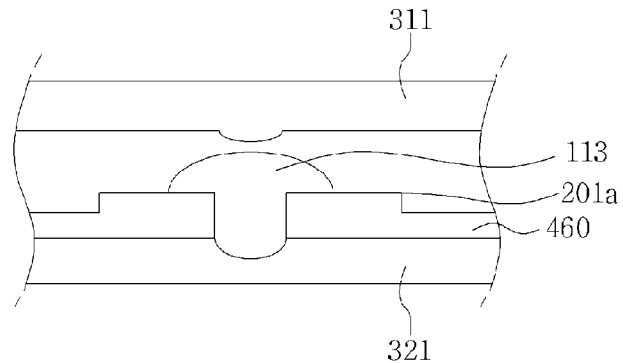
[Fig. 13]
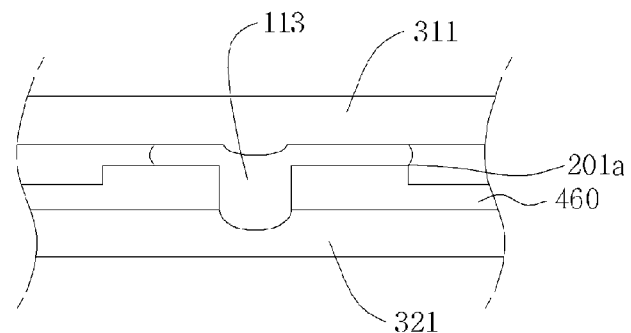
[Fig. 14]
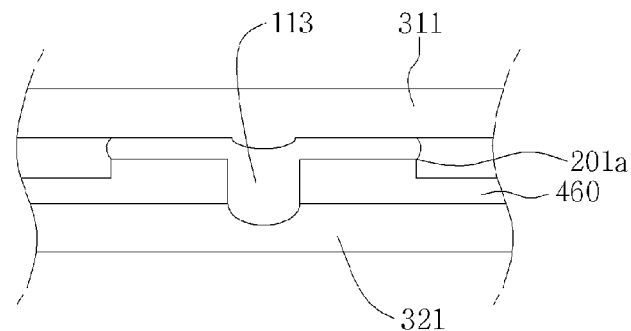
[Fig. 15]
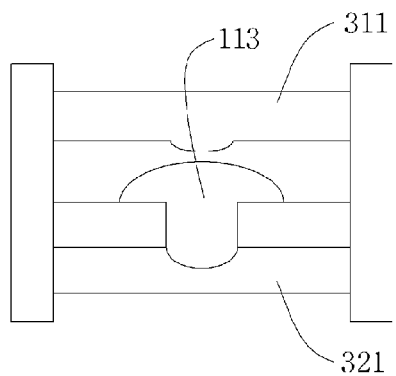

[Fig. 16]
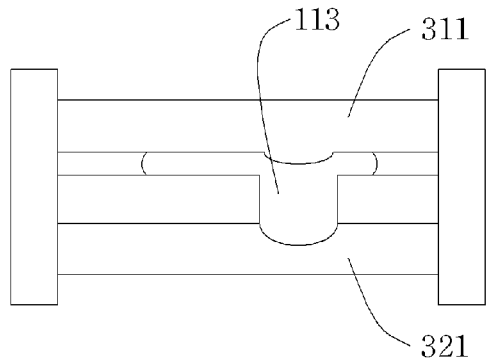
[Fig. 17]
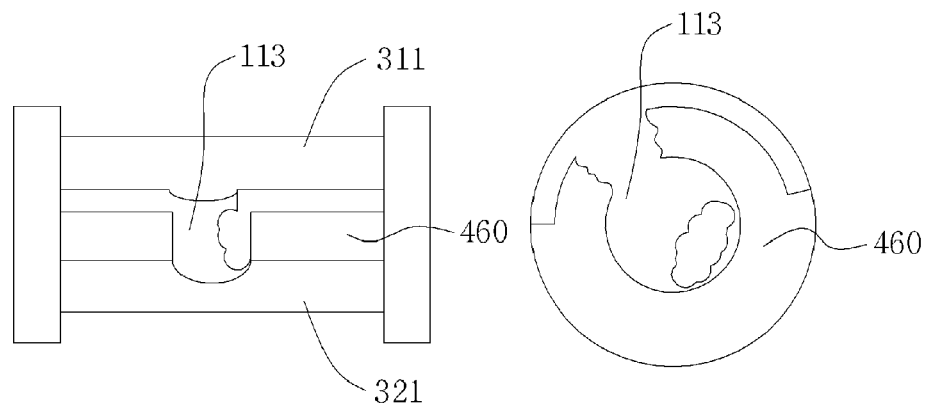
[Fig. 18]
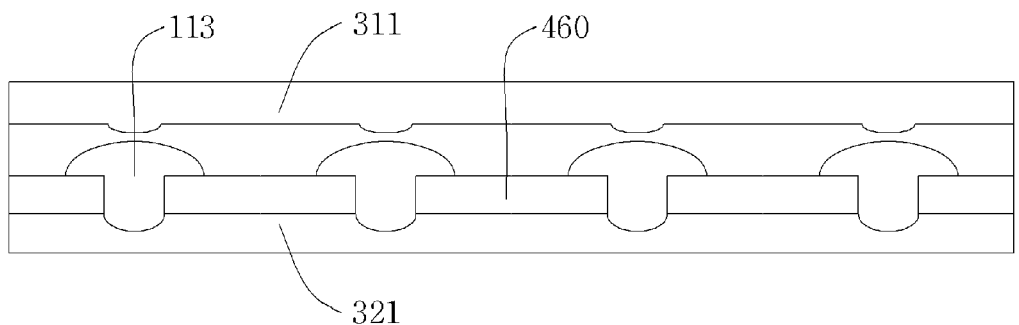
[Fig. 19]
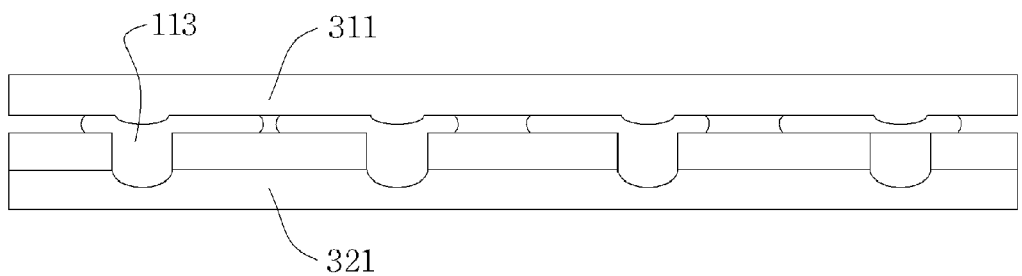

[Fig. 20]
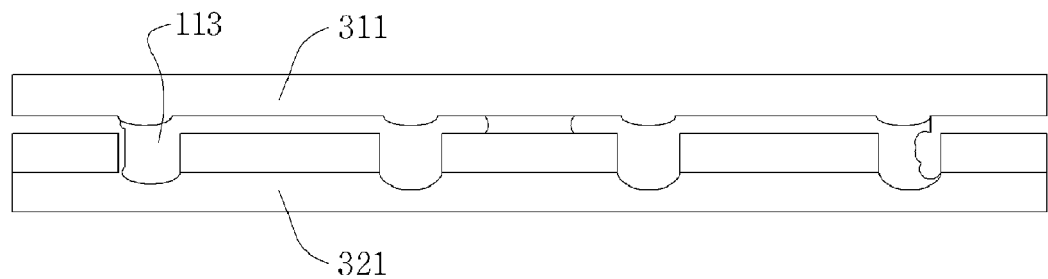
[Fig. 21]
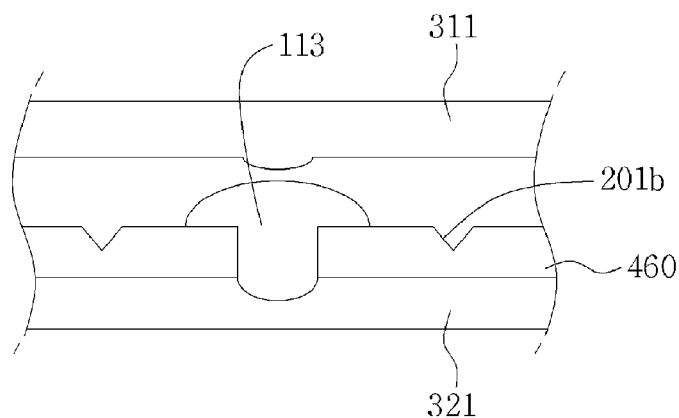
[Fig. 22]
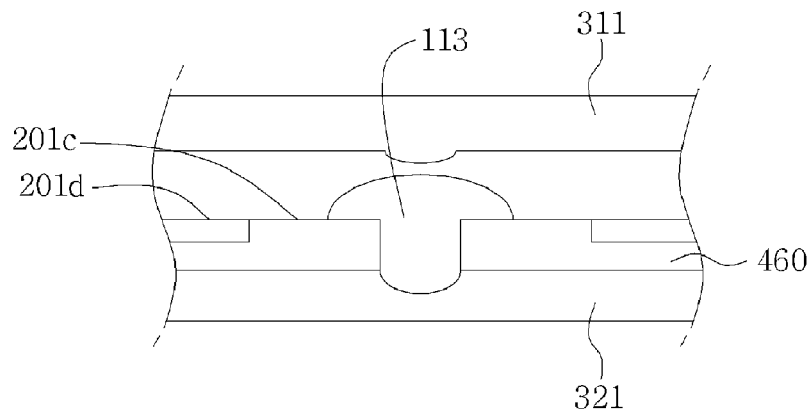

LENS UNIT COMPOSED OF DIFFERENT MATERIALS AND CAMERA MODULE AND METHOD FOR MANUFACTURING THE SAME

CROSS REFERENCE TO RELATED APPLICATIONS

The present application is a national phase entry under 35 U.S.C. §371 of International Application No. PCT/KR2008/003935, filed Jul. 3, 2008, which claims the benefit of Korean Patent Application No. 10-2007-0066509, filed Jul. 3, 2007. The disclosures of said applications are incorporated by reference herein.

TECHNICAL FIELD

The present invention relates to a lens unit, a camera module, and a method of manufacturing the same, and more particularly, to a lens unit composed of different materials in which a lens of optical resin is directly replicated on a base, a part of a camera module to form a lens, a camera module having the lens unit, and a method of manufacturing the lens unit.

BACKGROUND ART

Recently, as the use of mobile information storage appliances, such as mobile phones, PDAs, or the like, increases, a camera module, particularly a high-resolution micro camera module, is also in great demand.

FIG. 1 schematically shows a conventional camera module.

In the camera module, an image sensor 12a is located on a PCB 110. Depending upon the kind thereof, the image sensor 120a is mounted onto the PCB 110 using diverse SMTs (Surface Mount Technologies). A reference numeral 120b indicates a solder ball. Also depending upon the kind thereof, the image sensor 120a may be covered with diverse kinds of cover glasses 120c.

An infrared cut-off filter (IR filter) is provided cutting off infrared ray out of the range of visible ray, which causes noise. The IR filter is fabricated by forming an optical coating 140b on a glass substrate 140a.

The image sensor 120a is shielded from the outside by a barrel holder 130 which is joined onto the PCB 110. A lens module 150 is assembled onto the barrel holder 130. The lens module 150 is fabricated by the process that unit lenses 170a to 170c are first manufactured, the unit lenses 170a to 170c are arranged in a barrel 160a together with a spacer 160c, a stop 160d, flare stops 160e and 160f, and the like in order, and finally a cap 160b is assembled onto the barrel 160a to lock the lenses 170a to 170c and the barrel structures 160a to 160f.

As set forth above, the camera module includes the image sensor 120a, the IR filter, the barrel holder 130, the barrel structures 160a to 160f, the unit lenses 170a to 170c, and the like.

However, the conventional camera module constructed as above has problems as follows:

In the process of assembling the multiple parts of the camera module, an aligning error and tilting occur to cause degradation in optical performance. Further, a precise aligning assembling process required in order to solve this problem leads to increase in a production cost of the camera module.

Further, a design requirement that a larger assembling tolerance has to be secured puts restrictions on achieving a high performance micro camera module.

Still Further, in the conventional camera module, in case that a polymer lens is used, rigidity and durability of the conventional camera module are bad, whereas in case that a glass lens is used, the manufacturing cost is high, and there are many restrictions on the design thereof because of limitations on a realizable shape.

DISCLOSURE OF INVENTION

Technical Problem

Accordingly, the present invention has been made keeping in mind the above problems caused in the prior art. An object of the present invention is to provide a lens unit and a camera module having the lens unit in which high productivity and cost reduction are obtained, an aligning tolerance required in an assembly process is improved and the thickness thereof is reduced because the assembly thereof is very simple; and the degree of freedom for design is secured through removal of diverse design limitations.

A further object of the present invention is to minimize deformation in shape occurring in a forming process, thereby obtaining excellent quality of a product.

A still further object of the present invention is to provide a lens unit and a camera module having the same having higher rigidity and therefore durability.

A yet still further object of the present invention is to lower the manufacturing cost, and minimize the decrease in the degree of freedom for design due to limitations on realizable shape while providing high thermal resistance, by using optimal material and forming process, thereby considerably saving the overall process time and cost for manufacturing a final appliance.

A still yet further object of the present invention is to provide a lens unit compatible with diverse kinds of camera modules having high resolution or low resolution, and a camera module having the same.

A still yet further object of the present invention is to provide a manufacturing method of the lens unit by which the lens units are mass-produced with the same quality level maintained.

Technical Solution

In order to achieve the above objects, according to one aspect of the present invention, there is provided a lens unit for a camera module, the lens unit composed of different materials including a base and a lens, in which a part of a camera module of a different material from the lens is used as the base and the lens of optical resin is directly replicated on the base such that the lens is integrally formed on the base.

In an embodiment, the optical resin may be heat cured resin, and the lens is formed by curing the heat cured resin with heat.

In an embodiment, the optical resin may be light cured resin, and the lens is formed by curing the light cured resin with light.

In an embodiment, the optical resin may have a thermosetting property.

In an embodiment, the base may be any one of a barrel holder, a barrel, a cap, a stop, a spacer, a flare stop, an infrared cutoff filter, a cover glass, and a lens supporter structure.

In an embodiment, the base may have a surface flow resistances of which against flow of liquefied lens-forming material are different according to its positions.

In an embodiment, the flow resistance is smaller at a relatively-short distance position from a center of the lens than at a relatively-long distance position from the center of the lens.

In an embodiment, the base may have a through-hole in which the lens is formed.

In an embodiment, the base may be opaque.

In accordance with another aspect of the present invention, there is provided a camera module including a lens unit.

In an embodiment, the camera module may be a low resolution camera module having the single lens unit in which the lens is formed on a barrel holder. In the above embodiment, the camera module is provided by joining the single lens unit onto an image sensor-mounted circuit board, by which a process cost can be considerably saved in manufacturing a low grade camera module.

In accordance with a further aspect of the present invention, there is provided a method of manufacturing a lens unit, comprising a step of forming a lens array on a base array to form a lens unit array.

In an embodiment, the base array may be a single body, and after formed, the lens unit array is diced into a plurality of lens units.

In accordance with a further aspect of the present invention, there is provided a method of manufacturing a lens unit, wherein the lens unit is formed using a die whose surface contacting the base slopes in relation to its central axis to allow the base to self-align.

Advantageous Effects

According to the lens unit and the camera module having the same, owing to increase in the degree of freedom, the size reduction and the performance improvement of the camera module are advantageously obtained. In addition, owing to the reduction in the number of assembly parts, the simplification of the assembly process, reduction in manufacturing cost, and improvement in aligning accuracy are advantageously obtained.

Further, deformation in shape, which may occur in the forming process, is minimized to provide high quality lens unit and camera module.

Further, the lens is formed on a rigid material, which increases durability.

Further, since the lens unit and the camera module have high temperature operability and heat resistance, they can be directly subjected to a soldering (reflow) process for circuit-mounting.

In particular, since the lens unit can be manufactured in the form of an array, it is possible to increase a production rate. In addition, in case that the manufacturing method is used for a low-resolution camera module, the numbers of parts of the camera module and of the process steps are greatly reduced.

Further, the present invention provides the lens unit and the camera module which satisfy the requirements on the camera module having high-resolution or low-resolution.

Further, the present invention provides the manufacturing method of the lens unit by which the lens units are mass-produced with the same quality level maintained.

Further, the present invention prevents defects of the lens, such as voids, which is caused due to ununiform flow of the lens-forming material injected into the through-hole in the lens forming process.

BRIEF DESCRIPTION OF THE DRAWINGS

FIG. 1 is a schematic view illustrating a camera module according to the conventional art;

FIG. 2 is a view illustrating a comparative example of a camera module having a lens unit;

FIG. 3 is a schematic view for a process of manufacturing a lens unit according to a first embodiment of the present invention;

FIG. 4 is a schematic view for a process of manufacturing a lens unit according to a second embodiment of the present invention;

FIG. 5 is a schematic view for a process of manufacturing a lens unit according to a third embodiment of the present invention;

FIGS. 6 to 9 are schematic views illustrating a process of manufacturing a lens unit according to a fourth embodiment of the present invention;

FIG. 10 is a schematic view illustrating a camera module having a lens unit according to a fifth embodiment of the present invention;

FIG. 11 is a schematic view illustrating a camera module having a lens unit according to a sixth embodiment of the present invention;

FIGS. 12 to 14 are schematic views illustrating a process of manufacturing a lens unit according to a seventh embodiment of the present invention;

FIGS. 15 to 17 are views illustrating the problems occurring in a comparative example of a base;

FIGS. 18 to 20 are views illustrating the problems occurring in another comparative example of a base;

FIG. 21 is a schematic view for a process of manufacturing a lens unit according to an eighth embodiment of the present invention; and FIG. 22 is a schematic view for a process of manufacturing a lens unit according to a ninth embodiment of the present invention.

BEST MODE FOR CARRYING OUT THE INVENTION

Reference will now be made in greater detail to a preferred embodiment of the invention, an example of which is illustrated in the accompanying drawings.

First Comparative Example

FIG. 2 is a view illustrating a first comparative example of a camera module having a lens unit.

In order to obtain the improvements in assembly easiness, productivity, aligning tolerance and the degree of freedom; reduction in the manufacturing cost and the thickness of a camera module; and the like, a camera module is so constructed that the lens unit including barrel structures 160b, 160e and 160f as shown in FIG. 1 are formed using the same optical polymer as the lens.

In such a structure, there occur problems that optical functions, which the conventional barrel structures perform, i.e. stop, flare stop, ghost-prevention, or the like, can not be fulfilled any more. Accordingly, it is required to compensate for the problems, which act as restrictions on the design of the camera module.

That is, an opaque structure such as a stop or the like is required, which increases the number of parts. Accordingly, the number of processes and the overall thickness of the camera module increase.

Further, a transparent lens unit is exposed outside via a side of the camera module, through which external light can be incident to an image sensor. Therefore, an additional coating or structure is required.

Further, ununiform shrinkage and thereby deformation are created in the process of forming the relatively-thick barrel structure and the lens at the same time. Therefore, it is also required to compensate them.

Thus, it is proved that the structure of the lens unit 280a to 280c and the camera module as shown in FIG. 2 is not preferable.

Second Comparative Example

In this example, a lens is integrally formed on a base of different material from the lens, using thermoplastic material as a lens-forming material and an injection molding process as a forming process.

An insert-injection molding process can be used. In the insert injection molding process, after as a base, a part of a camera module is inserted in a mold, an upper mold and a lower mold are closed and molten thermoplastic resin is injected into a cavity of the mold via a runner and a gate, and then a cooling process and a releasing process are carried out. The insert-injection molding process provides very high productivity.

However, there are problems that durability, yield, and aligning precision between a lens face and the base are low due to relatively-high process temperature and pressure in the molding process of optical resin.

Third Comparative Example

In this example, a lens unit is formed using thermoplastic material as a lens-forming material and a hot-pressing process as a forming process.

In the hot-pressing process, thermoplastic optical resin is placed on a base, that is, a part of a camera module, molds are placed above and below the optical resin, and then the thermoplastic resin are pressurized at a glass transition temperature or above through heating process together with a pressing process.

As compared to the injection molding process, the hot-pressing process has advantages in that it can be carried out at a lower temperature than the injection molding process. In addition, the selection of material of the part of the camera module for the lens unit can be easily made because the base, the part of the camera module does not get a shock.

Further, it does not need a structure such as a runner, a cavity or the like for supplying the material, and thus, unnecessary consumption of the material can be reduced in the hot pressing process.

However, the present example has a problem that the excessively large process cost and time are required for mounting the camera module onto a circuit board (this problem also occurs in the second comparative example).

In the process of manufacturing an appliance having the camera module, a mounting process of the camera module onto the circuit board is required together with a high temperature process for soldering. For reduction in process cost and time, it is preferred that the camera module is mounted onto the circuit board before the soldering process.

However, in case of the camera module having a plastic lens manufactured by the injection molding process or the hot-pressing process, the camera module has to be mounted onto the circuit board after the soldering process because of low heat durability.

On the contrary, a glass lens has high heat durability, and thus the mounting process can be done before the soldering process. However, the manufacturing cost is high, and the degree of freedom for designing the lens is bad due to restrictions on its realizable shape.

Thus, the present invention is intended to propose a material and a forming process which can sufficiently satisfy the above two requirements which seem to be incompatible.

MODE FOR THE INVENTION

In the best mode of the invention, the lens unit is manufactured by a heat-curing process using heat cured resin and a light curing process using light cured resin.

The heat-curing process and the light curing process are processes using resin materials which are cured with heat or light energy, wherein optical resin is filled in a cavity formed in a base, a part of a camera module, and is cured using heat or light energy and then is released.

Such a lens unit can be fabricated by filling resin in the cavity using a runner and a gate as in an injection molding process. However, the manufacturing process is preferably performed in such a manner that a pre-determined quantity of material is applied into a cavity, and then the forming process is carried out. Since the process without using the runner and gate for supplying the material can remove loss of the material, it is preferred in view of reduction in the cost of material.

Since this forming process is carried out under the pressure lower than the injection molding process and the hot-pressing process, it has an advantage of preventing the damage of base due to a pressurizing force.

Further, the heat cured resin or the light cured resin generally has a thermosetting property. Therefore, in case of manufacturing the lens unit in which a lens is combined with the base of high heat durability, overall heat durability of a lens module can be advantageously improved.

In particular, it is preferred that considering a soldering temperature in the mounting of a camera module onto a circuit, the thermal endurable temperature of the optical resin is 250° C. or more.

Such a lens module of high heat durability can be used under high-temperature (Reflow) condition of a soldering process in the mounting of a camera module onto a circuit, the manufacturing cost of a camera module-mounted product can be advantageously reduced.

FIG. 3 is a schematic view for a process of manufacturing a lens unit according to a first embodiment of the present invention, and FIG. 4 is a schematic view for a process of manufacturing a lens unit according to a second embodiment of the present invention.

In the lens unit 480 according to the present invention, a lens is integrated with a base. Here, the base is a part of a camera module which is made of different material from the lens. The base has a through-hole in which the lens is formed. The base may be made of an opaque material which is different from the lens-forming material. In this structure, the camera module can shield itself from external light. Therefore, an additional coating process or structure is not required, which is very advantageous in reduction in manufacturing cost and size of the camera module. The lens of optical resin is directly replicated on the base.

As illustrated in FIG. 3, the lens of the optical resin is directly replicated in the through-hole of a structure, such as a barrel holder, a spacer, a stop, a flare stop, a barrel, a cap, or the like, to form the lens unit 480.

Further, as illustrated in FIG. 4, the lens of the optical resin is directly replicated on a flat structure, such as an IR filter, a cover glass, or the like, to form the lens unit 480.

Generally, in the IR filter, the cover glass or the like, nothing is provided on one surface so that an optical lens can be formed thereon, whereas a coating layer or an image sensor is provided on the opposite surface. Therefore, FIG. 4 shows the method of forming a lens with a single lens face. However, the flat structure, although it does not have a through-hole, can be so designed that two lenses are formed on its two surfaces, respectively.

A core may have a shape like a lower core 321 in FIG. 3 which molds the optical resin in a completely closed manner, or like an upper core 311 in FIG. 3 which molds the optical resin in a somewhat open manner by which flanges having diverse diameters can be formed according to the amount of the injected resin. The latter core has an advantage of minimizing damage or deformation of the base because there is no direct contact between the upper core and the base.

An upper die 310 and a lower die 320 may be made of, according to a forming process, glass, polymer, etc or combination thereof, as well as commonly used metal.

FIGS. 3 and 4 simply show examples of the lens unit. The structure of the lens unit can be diversely changed according to material, a shape or the like of the base, or a shape, a position or the like of an optical face.

Referring to FIGS. 3 and 4, a pre-fabricated base 460, a part of a camera module is first placed on the lower die 320, and the upper die 310 is placed down on the lower die in such a manner that the base 460 has the same center (center line) as an optical face to be formed later. Then, the optical face is formed by the upper and lower cores 311 and 321.

Since the lens unit using the light cured resin has to be cured with light, one or all of cores has to be transparent.

FIG. 5 is a schematic view for a process of manufacturing a lens unit according to a third embodiment of the present invention.

In manufacturing the lens unit of FIG. 3, the center alignment between the optical face of the lens and the base, such as a barrel structure, an IR filter, a cover glass, or the like, is a most important factor to determine a performance of the camera module.

For the center alignment between the base and the optical face, precisely machined lower and upper cores may be used as shown in FIGS. 3 and 4. However, since the base is shaped by an injection molding process, a dicing process, a grinding process, and the like, there may be a difference in shape between samples of the base, which may make centers of the samples not coincide with each other.

According to the present invention, for the precise center-alignment between the base and the optical face, as shown in FIG. 5, a base 460 is initially placed on a lower die 320 which is larger than the base, and a wedge-type upper die 310 is forced down onto the lower die with constant force so that an outer contour of the base 460 is brought into contact with an slope surface of the upper die 310 to allow the base to be center-aligned with the upper die 310.

To this end, the die has the slope surface which slopes in relation to its central axis and comes into contact with the base to allow the base to be automatically self-aligned with the die. In the embodiment of FIG. 5, the upper die has the slope surface. The slope surface is symmetric in relation to the central axis, and is further from the central axis as it goes downwards.

After the base 460 has been so positioned that it has the same center as the upper die 310, the upper and lower cores 311 and 321 whose tolerance have been so precisely managed that the upper and lower cores also have the same center as the upper die 310 are closed, providing the center-alignment between the optical face of the lens and the base 460.

FIGS. 6 to 9 are schematic views illustrating a process of manufacturing a lens unit according to a fourth embodiment of the present invention.

FIG. 6 schematically shows a step of placing, on a lower die, an array of bases 460, that is, a plurality of parts of a camera module.

The lower die 320 has a structure enabling the base array to be placed in its exact position, and an array of lens cavities corresponding to the base array.

The lens cavities of the lower die 320 are obtained by preparing individual cores, and then assembling the cores into the lower die. Alternatively, a cavity-integrated lower die can be used.

FIG. 7 schematically shows a step of forming an array of lenses on the base array.

The base array is fixed on the lower die 320, lens-forming material is applied onto the lens-cavity array, and an upper die 310 is moved onto the lower die to be closed. Then, the lens array is formed using engraved lens faces on the upper and lower cores.

Since the lens unit using the light cured resin has to be cured with light, part of the upper and lower cores at the least has to be transparent.

FIG. 8 schematically shows an array of the lens units 480 in which the lens array is formed on the base array. The lens unit array is diced into a plurality of lens units 480 as shown in FIG. 9. To this end, the base array is preferably a single body. However, the present invention is not essentially limited thereto. In this case, the dicing process is not required.

According to the manufacturing process of FIGS. 6 to 9, it is possible to increase yield and mass-produce while keeping the quality constant.

FIG. 10 is a schematic view illustrating a camera module having a lens unit according to a fifth embodiment of the present invention.

The camera module of the present invention is formed by assembling the lens unit manufactured by the processes of FIGS. 3 to 9, with other parts of the camera module. Here, the camera module is characterized in that at least one lens unit of the invention is included.

In the camera module having the lens unit, lenses 480d and 480e are formed on an IR filter and a cover glass, thereby attaining a further-improved optical characteristic as compared to the conventional camera module having the same size and allowing the size of the module to be reduced.

Since the lens on the base does not require a separate structure for maintaining a shape, a minimum gap between the optical faces which is required in a conventional camera module, is further reduced, thereby advantageously overcoming diverse restrictions on designing the conventional camera module.

Since the rigidity of lens is determined by the base having higher rigidity than the optical resin, the lens unit has relatively-improved durability compared to a conventional unit lens, thereby also improving the durability of the camera module. Further, in the replication process of the heat- or light-cured resin, the shrinkage-preventing effect can be obtained owing to an adhesion force between the base and the lens-forming material. Thus, a simple lens-support structure of glass with a through-hole which does not serve as a barrel structure is also useful as the base.

In particular, as set forth before, the lens unit using heat- and light-cured resins having a thermosetting property can endure a soldering process in the mounting of the camera module onto a circuit, thereby saving the manufacturing cost of an appliance having the camera module.

The base may be made of different material from the lens, such as glass, metal or polymer. The polymer may be liquid crystal polymer, epoxy polymer, or the like, which has high thermal-durability.

In particular, when the lens is employed to a low-class camera module having a single lens, such merits can be obtained best.

FIG. 11 is a schematic view illustrating a camera module having a lens unit according to a sixth embodiment of the present invention.

The demand for camera module increases in the fields of toys, vehicles, mobile-phones, or the like. In particular, a low-resolution camera module (VGA-class, QCIF-class, CIF-class, etc.) is increasingly demanded.

Such a low-resolution camera module uses a single lens to save the manufacturing cost. Particularly, in case of using the lens unit, it is possible to reduce the number of processes of assembling the camera module as well as the manufacturing cost of the lens module and thus attain the characteristic of the present invention.

To reduce the number of parts to be used in the low-resolution camera module, the lens 470 is formed on the barrel holder 130 in the lens unit as shown in FIG. 11. In this case, an IR filter for infrared cutoff is not used, but an IR-cutoff coating layer 481 is formed on the lens face to provide the IR-cutoff function. A cap 160b functioning like a diaphragm is provided over the barrel holder. However, in this case, since it is not impossible to adjust the focus, the lens and the structure having the same has to be designed to secure sufficient resolution only through the lens unit assembled with an image sensor-mounted circuit board.

FIGS. 12 to 14 are schematic views illustrating a process of manufacturing a lens unit according to a seventh embodiment of the present invention.

The base may have a surface flow resistance of which against flow of a liquid lens-forming material 113 varies according to its positions.

Preferably, the flow resistance is smaller at a relatively short distant position from a center of the lens, i.e. the through-hole that at a relatively long distant position from the center of the lens. The liquid lens-forming material is restricted to flowing within a predetermined boundary where the flow resistance is low, whereby defect of the lens, such as voids, is prevented.

To this end, as shown in FIGS. 12 to 14, a surface of the base has a height difference in which height is higher at a short distance position from a center of the lens than at a long distance position from the center.

Although flow in one direction first reaches the step 201a, the flow is restrained from advancing further owing to the surface tension of the lens, whereas flow in other direction continues to advance if satisfying the following condition Fa>Fb (Here, Fa is the flow resistance caused by the surface tension when the lens-forming material reaches the step 201a, and Fb is the flow resistance when the lens-forming material does not reach the step 201a and continues to advance in the short distance area from the center of the lens.)

Advantages of the base shown in FIGS. 12 to 14 can be understood with reference to a comparative example as follows.

FIGS. 15 to 17 are views illustrating the problems caused in the comparative example of the base.

When forming a single lens, a guide is an essential element for alignment of upper and lower molds. In this case, the lens-forming material restricted by the upper and lower molds moves along a wall face due to a capillary phenomenon, which draws the lens-forming material 113 out of the cavities, causing void-defect in the lens.

FIG. 17 shows a side cross-sectional view together with a plan view.

FIGS. 18 to 20 are views illustrating the problems caused in another comparative example of the base.

As shown in the figures, when two adjacent liquid lens-forming materials meet together, the lens-forming material is drawn out not to completely fill the lens cavities of the mold, whereby void-defect is created in the lens.

FIG. 21 is a schematic view for a process of manufacturing a lens unit according to an eighth embodiment of the present invention.

The height difference may have diverse shapes, such as a groove (FIG. 21), or the like, as well as the step (FIGS. 12 to 14).

FIG. 22 is a schematic view for a process of manufacturing a lens unit according to a ninth embodiment of the present invention.

The flow resistance can be given different values by using a wettability difference of a surface. The wettability is an index of determining how well liquid material spreads on a surface. The larger the wettability, the better the liquid material spreads.

For example, the surface has higher surface roughness at a relatively-short distance position 201c than at a relatively-long distance position 201d from centers of a wafer-scale array of lenses.

Here, the surface roughness is the physical surface wettability. It has to be noted that as the roughness is higher, the wettability is larger, the flow resistance is smaller, and liquid material spreads better, and vice versa.

If the surface roughness is higher at a short-distance position, the liquid lens-forming material first spreads well on the high-roughness surface. When it meets the low-roughness surface, it receives larger flow resistance to stop its further advance.

As another form of wettability, there is chemical wettability which is closely related to surface energy.

That is, the surface has higher surface energy at a relatively-short distance position 201c than at a relatively-long distance position 201d from the centers of a wafer-scale array of the lenses. The higher the surface energy is, that is, the higher the reactivity between the surface and the liquid material is, the larger the wettability is. To this end, a hydrophilic (good wettability) treatment and a hydrophobic (poor wettability) treatment can be implemented using diverse commonly-used materials and processes.

For example, surface-modification agent providing the hydrophilicity may be coated in the short-distance area within a predetermined boundary, or otherwise surface-modification agent providing the hydrophobicity may be coated in the a long-distance area outside a predetermined boundary so as to form a boundary of the surface energy.

In this case, when meeting the surface having low surface energy, the liquid lens-forming material which has freely flowed on the surface having high surface energy, receives greater flow resistance to stop further advancing forward.

The invention claimed is:

1. A lens unit composed of different materials comprising a base and a lens,
   a part of a camera module of a different material from the lens being used as the base, and
   the lens of optical resin being directly replicated on the base such that the lens is integrally formed on the base, wherein the base has a through-hole and the lens is formed in and around the through-hole, wherein the base has a surface whose flow resistance against flow of liquefied lens-forming material varies according to its position, wherein a flow resistance at a relatively-short distance position from a center of the lens is smaller than a flow resistance at a relatively-long distance position from the center of the lens, and wherein when the liquefied lens-forming material reaches a boundary between the relatively-short distance position and the relatively-long distance position, the liquefied lens-forming material is subject to increase in flow resistance as large as a difference between the flow resistance at the relatively-short distance position and the flow resistance at the relatively-long distance position against further progress of the liquefied lens-forming material towards the relatively long-distance position.

2. The lens unit according to claim 1, wherein the optical resin is heat cured resin, and the lens is formed by curing the heat cured resin with heat.

3. The lens unit according to claim 1, wherein the optical resin is light cured resin, and the lens is formed by curing the light cured resin with light.

4. The lens unit according to claim 1, wherein the optical resin has a thermosetting property.

5. The lens unit according to claim 1, wherein the part of the camera module is any one of a barrel holder, a barrel, a stop, a spacer, and a lens-support structure.

6. The lens unit according to claim 1, wherein the base is made of liquid crystal plastic.

7. The lens unit according to claim 1, wherein the surface of the base has a height difference in which height is higher at the relatively-short distance position from the center of the lens than at the relatively-long distance position from the center of the lens.

8. The lens unit according to claim 7, wherein the height difference is shaped like a step or a groove.

9. The lens unit according to claim 1, wherein the surface of the base has roughness which is larger at the relatively-short distance position from the center of the lens than at the relatively-long distance position from the center of the lens.

10. The lens unit according to claim 1, wherein the base has surface energy which is larger at the relatively-short distance position from the center of the lens than at the relatively-long distance position from the center of the lens.

11. The lens unit according to claim 1, wherein the base is opaque.

12. A camera module comprising the lens unit according to claim 1.

* * * * *